Aug. 28, 1934.     M. G. STEELE     1,971,735

TOY

Filed April 13, 1933

INVENTOR:
MAURICE G. STEELE
Kwis Hudson & Kent
ATTORNEYS

Patented Aug. 28, 1934

1,971,735

UNITED STATES PATENT OFFICE 1,971,735

TOY

Maurice G. Steele, Rome, N. Y.

Application April 13, 1933, Serial No. 665,924

6 Claims. (Cl. 35—12)

This invention relates to toys of the so-called question and answer type, in which there is a mechanism that is capable of being set to record a particular question and means for indicating the answer to the question when the mechanism is so set.

It is one of the objects of the invention to provide a device of the character described that will be highly instructive and therefore of an educational nature, and which will be adapted for answering questions on an unlimited number of subjects.

A further object of the invention is to provide a device that will be capable of answering any number of questions on any particular subject, thereby permitting the device to be used as a child's book of knowledge, in question and answer form.

It is a further object of the invention to provide a device that will be interesting to adults as well as children, and capable of being used to answer conundrums and for other purposes involving questions and answers.

It is also an object of the invention to provide a device which, to the child, will be attractive and involve an element of mystery in its operation, as well as being of an educational nature.

Other objects of the invention and the features of novelty will be apparent from the following description, taken in connection with the accompanying drawing, of which Figure 1 is a plan view with certain parts broken away to disclose the operating mechanism of the device;

Fig. 6 is an enlarged transverse section on the line 6—6 of Fig. 1;

Figure 2:
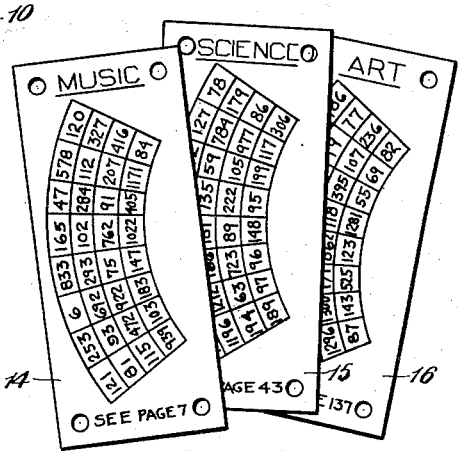
Fig. 2 is a plan view of a group of three charts such as may be used with the device illustrated in Fig. 1.

I have illustrated in the drawing what I now consider to be the preferred form of my invention, and the device therein illustrated comprises a rectangular base 10 of wood or any other suitable material, said base having arranged thereon four upstanding pins 11 by which a chart 12 is removably located in proper relation to the other parts of the device. The chart 12 has perforations 13 to receive the pins 11 and contains a series of indicia, preferably in the form of numbers, arranged in concentric arcs as shown. Each of the numbers on the chart 12 corresponds with the number of the answer to a question. Any number of charts 12 may be used, relating to any number of different subjects, and in Fig. 2 I have illustrated three such charts 14, 15 and 16 which, respectively, carry the numbers corresponding to particular answers relating to the subjects of music, science, and art.

Figure 1:
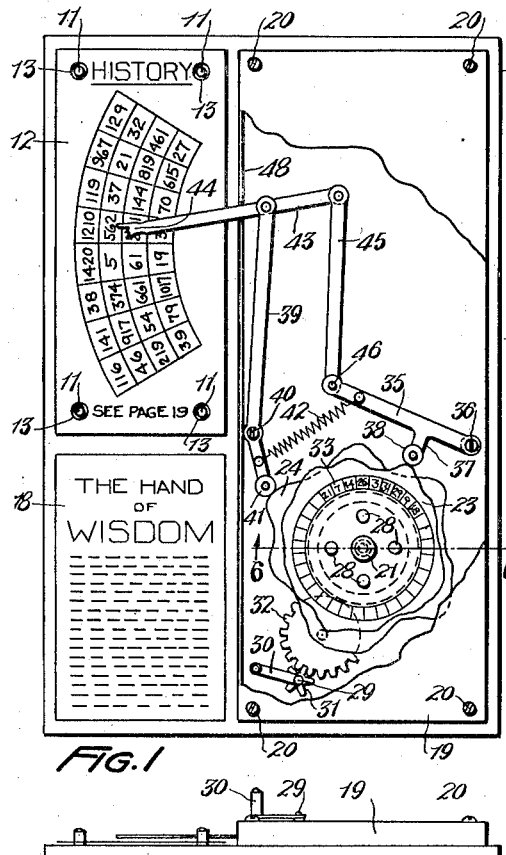
Figure 5:
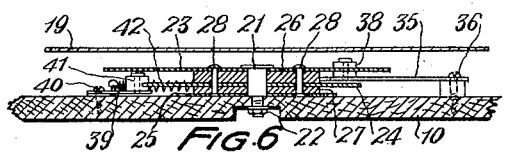
Fig. 5 is an end elevation of the device shown in Fig. 1.
Figure 3:
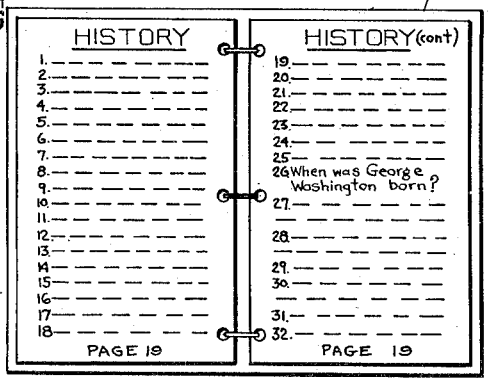
Fig. 3 is a plan view of an open, loose-leaf cover book, such as may be used with the device.
Figure 4:
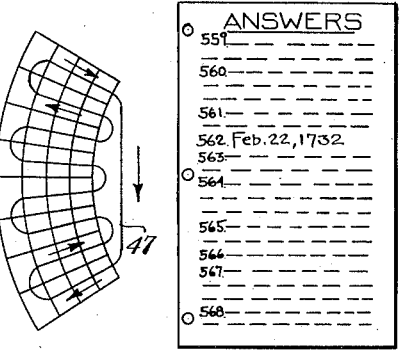
Fig. 4 is an illustration of a page of answers to questions adapted for use in the book illustrated in Fig. 3 or in a similar book of answers to the questions on the pages of the book illustrated in Fig. 3.

In Fig. 3, there is illustrated a loose-leaf binder 17, such as might be used for pages, as illustrated in Fig. 4, giving the answers to the different questions, each of these answers bearing a distinguishing number corresponding to a number on a chart such as 12. The pages illustrated in Fig. 3, contain the questions which are to be answered by the device, and it will be noted that the pages illustrated in Fig. 3 bear the designation "Page 19" and that the chart 12, at the bottom, contains the legend "See page 19". This associates each chart 12 with a page or pages of the book of questions, so that the indicia on the chart 12, illustrated in Fig. 1, are the numbers of the answers to the thirty-two questions indicated on the pages 19 of Fig. 3. From Fig. 2 it will be noted that each chart has a reference to the particular page or pages of questions with which it is associated. The pages of questions constitute a book and, similarly, the pages of answers constitute another book and both of these books may be included in a single binder, or they may be in separate binders, as preferred.

Below the chart 12, there may be secured to the base 10 a card 18, containing the directions for operating the device, and arranged on the base 10, to the right of the chart 12, is a sheet metal housing 19 for the operating parts of the device, this housing being secured to the base by the screws 20, which permit its removal whenever desired.

Beneath the housing 19 there is a pivot pin 21 which is secured to the base 10 as by the nut 22, and has rotatably arranged thereon a member comprising the cams 23 and 24, the gear wheel 25, and the spacing disks 26 and 27, all of these parts being secured together by rivets 28, or in any other suitable manner. A pinion shaft 29 is suitably journalled in the base 10 and the housing 19 and carries a crank 30 above the housing and a pinion 31 just above the base 10 and in the plane of the gear 25. An intermediate gear 32 is rotatably mounted on the base 10, between the pinion 31 and the gear 25 and is in mesh with both the pinion and the gear 25 so that, by rotating the crank 30, the cams 23 and 24 may be rotated.

Arranged on the upper surface of the cam 23 is a circular series of indicia 33 that is coaxial with the pivot pin 21, and the numbers of this series correspond with the numbers of the questions appearing on the pages of the question book illustrated in Fig. 3. It will be noted from Fig. 3 that there are thirty-two questions indicated on the pages numbered 19, and the series of indicia 33 would comprise these thirty-two numbers. There is a window 34 in the upper surface of the housing 19 with which any one of the numbers of the series of indicia 33 may be brought into registration, so that the number will be visible through the window.

A lever 35 is fulcrumed to the base 10, at 36, and has a laterally projecting arm 37 carrying a cam roller 38 which cooperates with the edge of the cam 23. Another lever 39 is fulcrumed to the base 10, at 40, and carries a cam roller 41 which cooperates with the edge of the cam 24. A tension spring 42 has its ends secured to the levers 35 and 39 and serves to hold the rollers 38 and 41 in engagement with their respective cams, as shown. The long arm of the lever 39 has a pointer 43 pivoted thereto, the outer end of this pointer carrying the representation of a hand 44 which is adapted to be moved over the numbers on the chart 12 so as to point to any one of these numbers. The opposite end of the pointer 43 is pivotally connected with a link 45 and this link is also pivoted to the long arm of the lever 35, at 46.

Figure 8:
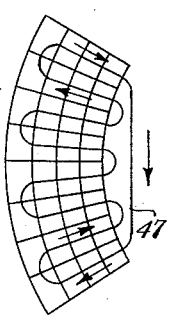
Fig. 8 is a diagram illustrating the path of the pointer of the device, over one of the answer charts.

The contours of the cams 23 and 24 are so shaped that the linkage carrying the pointer 43 will be so moved that the hand 44 will be caused to follow the path indicated by the line 47 in Fig. 8. While the path indicated by the line 47 may be preferred, it will be evident that the cams 23 and 24 may be so shaped as to cause the hand 44 to follow any other course over the indicia on the chart 12.

Figure 7:
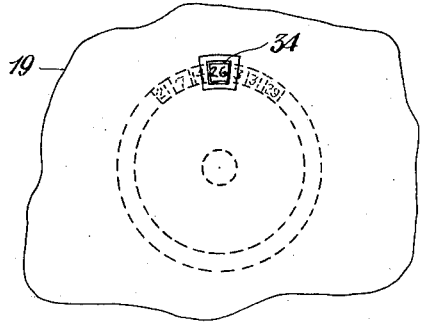
Fig. 7 is an enlarged plan of a portion of the cover of the mechanism which is broken away in Fig. 1.

In operating the device, the appropriate chart 12 is placed in the position shown in Fig. 1. This chart must correspond with the pages of the book shown in Fig. 3, that contain the questions for which answers are desired. When any particular question is selected, such as question No. 26 in Fig. 3, the crank 30 is rotated until the number 26, of the series 33, is brought into registration with the window 34, as shown in Fig. 7. The turning of the crank 30 causes the hand 44 to move over the chart 12 in a somewhat mystifying manner, and when the No. 26 registers with the window 34, the hand will stop at the number 562 on the chart 12 and thereby indicate the number of the answer to question No. 26. The operator then turns to answer No. 562 in the answer book (see Fig. 4) and there finds the answer to the question.

From Fig. 1, it will be noted that practically all of the mechanism of the device is concealed within the housing 19 and, aside from the crank 30, the only moving parts that are visible are the series of numbers 33 and the pointer 43 which projects through a slot 48 in the side wall of the housing 19. This lends an air of mysticism to the operation of the device which, taken with the peculiar manner of movement of the hand 44, is very fascinating to a child.

While I have illustrated and described what I now consider to be the preferred embodiment of my invention, it will be evident that various changes will be made in the details of construction and arrangement of parts without departing from the spirit of the invention as defined in the appended claims.

Having thus described my invention, I claim:

1. In a toy of the class described, the combination of a base adapted to hold a chart comprising a series of indicia, a pointer movable in a zigzag path over said chart to indicate any one of the series of indicia, rotatable cam means having associated therewith a series of indicia arranged in a circle about the axis of said cam means, means for rotating said cam means, a linkage operatively connected with said pointer and cooperating with said cam means to position the pointer to indicate the indicia on said chart corresponding with any selected indicia of the series associated with said cam means, and means with which such selected indicia may be brought into registration to effect the desired positioning of said pointer.

2. In a toy of the class described, the combination of a base adapted to hold a chart comprising a series of indicia, a pointer movable in a zigzag path over said chart to indicate any one of the series of indicia, movable cam means having associated therewith a series of indicia, means operatively connected with said pointer and cooperating with said cam means to position the pointer to indicate the indicia on said chart corresponding with any selected indicia of the series associated with said cam means, and means with which such selected indicia may be brought into registration to effect the desired positioning of said pointer.

3. In a toy of the class described, the combination of a base adapted to hold a chart comprising a series of indicia, a pointer movable over said chart to indicate any one of the series of indicia, a plurality of rotatable cams having associated therewith a series of indicia, levers having fixed fulcrums and cooperating with said cams so as to be actuated thereby, means operatively connecting said pointer with said levers, and means with which the respective indicia of the last mentioned series may be brought into registration to effect the desired positioning of said pointer.

4. In a toy of the class described, the combination of a base adapted to hold a chart comprising a series of indicia, a pointer movable over said chart to indicate any one of the series of indicia, a pair of rotatable cams with one of which there is associated a circular series of indicia, two levers having fixed fulcrums, one of said levers having means cooperating with one of said cams so as to be actuated thereby, the other of said levers being actuated by the other of said cams, means operatively connecting said pointer with said levers, and a housing for said cams having a window with which the individual indicia of said circular series may be brought into registration.

5. In a toy of the class described, the combination of a base adapted to hold a chart comprising a series of indicia, a pointer movable over said chart to indicate any one of the series of indicia, a pair of rotatable coaxially arranged cams having operatively associated therewith a circular series of indicia, a lever having a fixed fulcrum and cooperating with one of said cams so as to be actuated thereby, another lever having a fixed fulcrum and actuated by the other of said cams, a pivotal connection between one of said levers and said pointer, a link connecting the other of said levers with said pointer, gearing for rotating said cams, a housing for said cams, levers and gearing and having means with which the individual indicia of said circular series may be registered, and manually operable means on the exterior of said housing for actuating said gearing.

6. In a toy of the class described, the combination of a base adapted to hold a chart comprising a series of indicia, a housing removably secured to said base, a rotatable member within said housing and having a circular series of indicia thereon, said housing having an opening therein through which the individual indicia of the last-mentioned series may be observed, a pointer projecting from said housing into cooperative relation with the indicia of said chart, means actuated by said rotatable member and operatively connected with said pointer to move the pointer in a zigzag path, and means accessible from the exterior of said housing for rotating said member.

MAURICE G. STEELE.